UNITED STATES PATENT OFFICE.

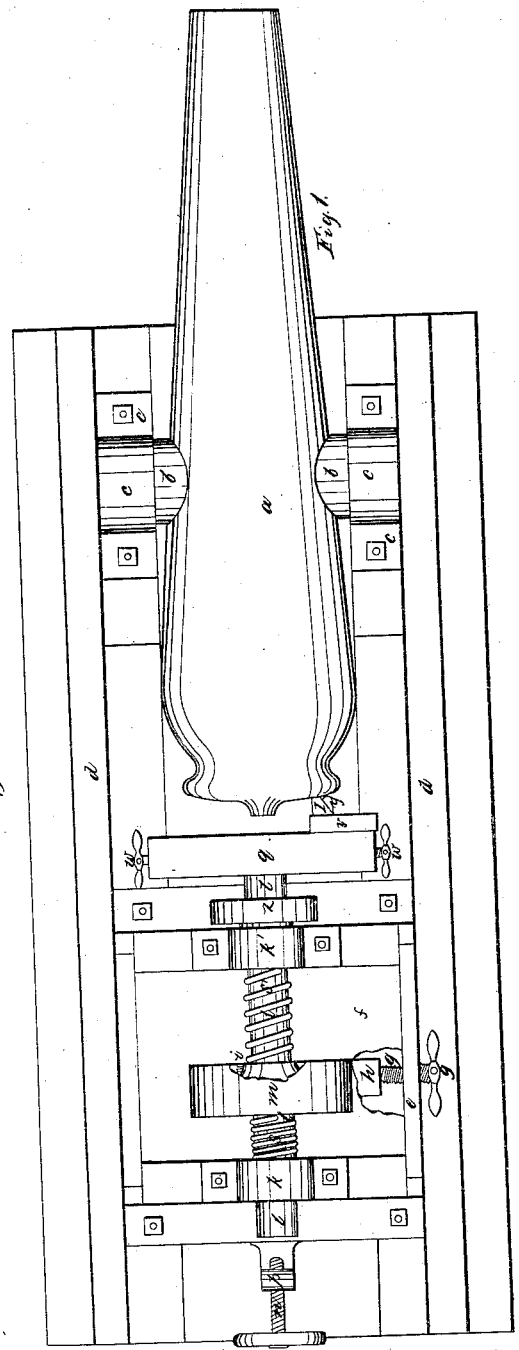

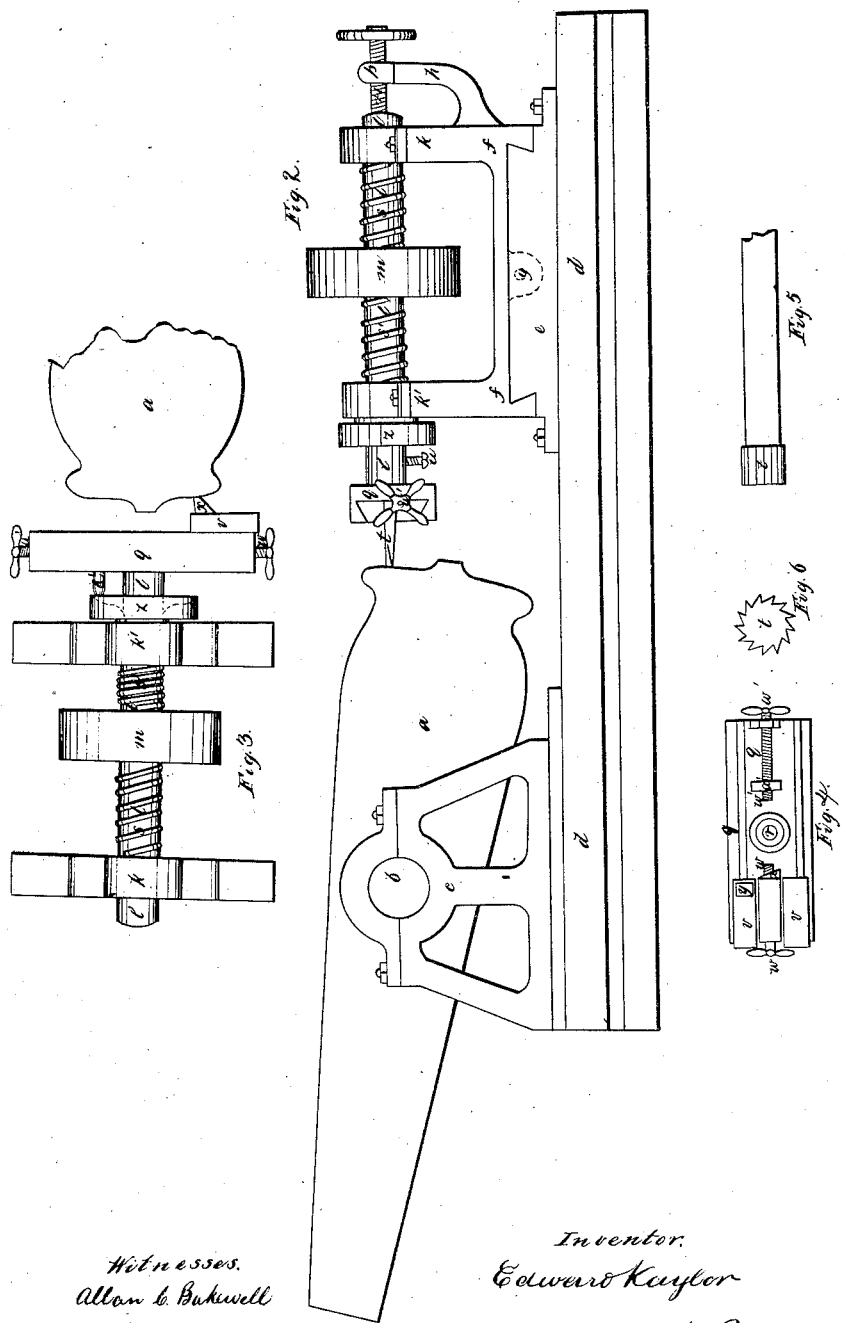

EDWARD KAYLOR, OF PITTSBURG, PENNSYLVANIA.

MACHINE FOR FINISHING THE CASCABEL OF GUNS.

Specification forming part of Letters Patent No. 50,139, dated September 26, 1865.

*To all whom it may concern:*

Be it known that I, EDWARD KAYLOR, of the city of Pittsburg, in the county of Allegheny and State of Pennsylvania, have invented a new and useful Improvement in Machines for Finishing and Ratcheting the Cascabel of Guns; and I do hereby declare the following to be a full, clear, and exact description thereof, reference being had to the accompanying drawings, forming part of this specification, in which—

Figure 1 is a plan or top view of my machine as arranged for planing the face of the cascabel. Fig. 2 is a side elevation of my machine, showing it arranged for boring the ratchet-holes in the cascabel. Fig. 3 is a side view of my machine, exhibiting a modified arrangement for planing the face of the cascabel. Fig. 4 is a front view of the cross-head or tool-carrier detached from the machine. Figs. 5 and 6 represent the ratcheting-tool.

In the several figures like letters of reference denote similar parts of the machine.

In the manufacture of ordnance it is important that the work be done as much as possible by machinery, because not only can it be thereby done with much greater rapidity, but it secures a greater degree of uniformity of shape and more perfect finish than can be readily attained by hand, and requires a less degree of skill in the operatives employed. After guns are cast they are turned by machinery, in those parts which can be thus operated upon, by revolving the gun on its axis before a tool or cutter having a longitudinal feed motion parallel to the axis of the gun. Some portions of the gun cannot, however, be thus operated upon, in which the cascabel forms an important part. The cascabel is usually finished by hand, and the ratchet-holes in the face of the cascabel above the knob are also made by hand.

The object of my machine is to plane the face of the cascabel, giving it the requisite curve or contour, and to make the ratchet-holes.

In the drawings, $a$ represents a navy-gun, with its trunnions $b$ set at suitable bearings in the pillar-blocks $c$, which are attached to the bed-plate $d$ of the machine. At the rear end of the machine, across the bed-plate $d$, is a base, $e$, on which is set the sliding carriage $f$, which slides on its base $e$ in dovetailed bearings, as shown in Fig. 2, across the machine or at right angles to the axis of the gun.

The motion of the sliding carriage is effected and controlled by a screw, $g$, having its smooth bearing in one side of the base $e$, while the screw takes into a nut, $h$, attached to the under side of the sliding carriage $f$.

At each end of the sliding carriage is a pillar-block, $k$, in which are the bearings of the shaft $l$. This shaft not only revolves in its axis in the bearings $k$ $k'$, but is capable of a longitudinal motion in the direction of its axis. The rotation of this shaft is effected by means of a belt passed round a pulley, $m$, or by gearing connected therewith. This pulley $m$ is fastened to the shaft $l$ by a set-screw or key, $i$, (shown in Fig. 1 by removing part of the rim of the pulley,) which is passed through the hub of the pulley and bears against or takes into the shaft $l$. Thus the pulley $m$ may be set at any required point on the shaft $l$ between the bearings $k$ $k'$. A spiral spring, $s$, is placed around the shaft $l$, between the hub of the pulley $m$ and the rear bearing, $k$, and another spiral spring, $s'$, is placed around the shaft $l$ between the hub of the pulley $m$ and the forward bearing $k'$. When the pulley is set, as in Fig. 3, nearer to the forward bearing, $k'$, than to the rear bearing, $k$, the spring $s'$, being compressed, tends to force the shaft backward, while the spring $s$ is so relaxed as to exert very little force in the opposite direction; but when the pulley $m$ is set nearer to the rear bearing, $k$, as in Fig. 1, the spring $s'$ is relaxed and the spring $s$ is compressed, so that the latter, bearing against the hub of the pulley, presses the shaft forward toward the gun. In Fig. 2, where the shaft is not required to be pressed in either direction the pulley is set midway between the bearings $k$ $k'$ of the shaft and the shaft is fed forward, as occasion requires, by a feed-screw, $n$, which has its bearing in the bracket $p$ at the rear end of the machine, the point of the screw $n$ pressing against the end of the shaft $l$.

At the forward end of the shaft $l$ is placed the cross-head $q$, which is an oblong frame rigidly attached to the shaft $l$, so as to revolve with it. In the axis of the extremity of the shaft $l$ and in the center of the cross-head $q$ is a circular cavity, $r$, to receive the boring-tool $t$, (seen in Figs. 5 and 6,) which is used to bore the holes for the ratchets in the face of the cascabel of the gun. The boring-tool $t$ is fastened in its place in the axis of the shaft $l$ by the set-screw $u$, so that it revolves with the shaft.

When the ratchet-holes are to be bored in the face of the cascabel or end of the gun, the gun $a$ is turned on its trunnions, as seen in Fig. 2, the breech end being depressed, so as to bore the ratchet-holes in the proper place above the knob of the cascabel. As the ratchet-holes are oblong in shape, the sliding carriage $f$ is moved slowly sidewise by means of the screw $g$ until the ratchet-holes are made of the proper length. The boring-tool $t$ is fed forward by means of the feed-screw $n$ pressing against the end of the shaft $l$.

I will now proceed to describe the apparatus employed for planing the face of the cascabel, premising that the boring-tool $t$ is removed when the planing-tool is at work.

In the cross-head $q$ is a dovetailed recess, (seen in Fig. 2, which shows an end view of the cross-head,) and in this recess slides the tool-carrier $v$, which is moved toward or from the center of the cross-head by means of the screw $w$. The tool or cutter $x$, which planes the face of the cascabel, is set in the sliding tool-carrier $v$, projecting from its face, as seen in Fig. 1, so that the point of the cutter $x$ presses against and cuts into the face of the cascabel of the gun.

To one side of the cutter $x$, and a little in the rear of the point of the cutter, or farther from the center of the cross-head, is a guide, $y$, (see Figs. 1 and 4,) which is set in a cavity in the sliding tool-carrier $v$, and the point of which guide $y$ is rounded and smooth. As the cross-head revolves around the cascabel of the gun, the axis of the shaft being set so as to coincide exactly with the axis of the gun, the cutter $x$ makes a circular cut on the face of the cascabel, and as the cross-head revolves the screw $u$ is gradually turned, by means of a knocker or by hand, so as to feed the cutter $x$ gradually toward the center or axis of the gun. The spiral spring $s$ forcibly pressing the cutter $x$ against the gun, the point of the guide $y$ traverses the surface planed by the cutter $x$ at its previous revolution, so that the cutter continually planes an evenly-smooth surface.

If it is desired to regulate the curvature of the face of the cascabel by hand, the pulley $m$ is set nearer to the forward bearing $k'$, so that the spring $s'$ may act to press the cutter away from the gun, and the screw $n$, at the rear end of the shaft, is gradually turned so as to press the cutter toward the gun or allow it to recede, according to the contour desired to be given to the face of the cascabel.

If it is desired to plane the face of the cascabel to a given shape, previously determined, it is done by means of the apparatus shown in Fig. 3. On the shaft $l$, between the cross-head $q$ and the forward bearing $k'$ of the shaft, is fixed a forming-disk, $z$, the face of which toward the gun, from its periphery to the shaft $l$, has a shape corresponding to the curvature to be given to the cascabel of the gun, or such a curvature as will produce the required curvature on the cascabel, by the means hereinafter described: The distance from the periphery of the disk $z$ to the shaft $l$ being less than the distance from the periphery of the cascabel to its knob, the guide-pin $a'$, which traverses the face of the forming-disk $z$, has a correspondingly slower motion toward the center of the cross-head $q$ than the cutter $x$ has, which difference is provided for by the greater pitch of the screw $w$, by which the cutter $x$ is moved, than that of the screw $w'$, by which the guide-$a'$ is operated. The guide-pin $a'$ works in a slot in the cross-head $q$ at the opposite end from that in which the cutter-holder $v$ is set, and is operated by a screw, $w'$, (see Fig. 4,) which is turned at each revolution of the cross-head by knocker. The point of the guide-pin $a'$ projects from the back of the cross-head (see Fig. 3) and rests against the face of the forming-disk $z$. As the pulley $m$ is set on the shaft $l$ so as to compress the spiral spring $s'$, the point of the guide-pin is always pressed backward against the face of the forming-disk $z$, and as the pin $a'$ revolves over the disk $z$ in a spiral path, gradually approaching the shaft $l$, so the cutter $x$, gradually approaching the axis of the gun as it revolves, planes the surface of the cascabel to a curve similar to that on the face of the disk $z$. The difference between the curve of the forming-disk and that produced by it on the face of the cascabel is owing to the fact that the axial ordinates of curvature are of the same length, while the radial distance between these ordinates differs, owing to the radius of the operative face of the disk being shorter than the radial distance from the knob of the cascabel to its periphery. This is rendered necessary when the disk $z$ is of less diameter than the cascabel of the gun, because the guide-pin $a'$ cannot approach nearer to the center of the disk $z$ than the periphery of the shaft $z$, on which it is fixed; but if the disk $z$ be made sufficiently large, the curvature of its face may be the same as that of the face of the cascabel, in which case the pitch of the screw $w$ and $w'$ is made exactly alike.

Having thus described my improved machine for finishing the cascabel of guns, what I claim as my invention, and desire to secure by Letters Patent, is—

1. The use of a revolving cutter, guided, as hereinbefore described, by means of a point pressing against that part of the face of the cascabel which has been operated upon by the cutter, in combination with the screw and tool-carrier for moving the cutter toward and from the axis of the gun, for the purpose of planing the cascabel of guns.

2. The use of a revolving cutter having a guide-point revolving with it and pressing against the face of a forming-disk, in combination with the tool-carrier and screws for moving the guide-point toward the center of the disk as the cutter moves toward the axis of the gun, for the purpose of planing the cascabel of guns to any required shape, substantially as hereinbefore described.

3. Combining in one machine the tools for ratcheting and planing the cascabel, all constructed, arranged, and operating substantially as hereinbefore described.

In testimony whereof I, the said EDWARD KAYLOR, have hereunto set my hand.

EDWARD KAYLOR.

Witnesses:
   W. BAKEWELL,
   A. S. NICHOLSON.